Patented Aug. 14, 1951

2,563,846

UNITED STATES PATENT OFFICE 2,563,846

CYCLOPENTANOPERHYDROPHENAN-THRENE COMPOUNDS

Emil Kaiser and Jerry Svarz, Chicago, Ill., assignors to Armour and Company, Chicago, Ill., a corporation of Illinois No Drawing. Application March 16, 1948, Serial No. 15,281

11 Claims. (Cl. 260—397.1)

This invention relates to compounds of the cyclopentanoperhydrophenanthrene series and to processes for their manufacture. More particularly the invention deals with such compounds which are esters and to derivatives of such esters.

We have found that improved esters of the cyclopentanoperhydrophenanthrene series can be prepared by reacting organic sulfonic esters of alcohols of the cyclopentanoperhydrophenanthrene series with carboxylic acid esters which contain the group CHM, where M is a metal. We have further discovered that these esters may be hydrolyzed to prepare acids which in some cases may be separated to prepare separate isomers.

Our new esters and acids are useful as therapeutical agents and may be used in combination with other substances in pharmaceutical manufacture. They are also useful as emulsifiers and as intermediates in the preparation of other useful compounds.

By our methods, only the carboxyl-containing group is introduced in the cyclopentanoperhydrophenanthrene nucleus, and there is no change of the double bonds or in the number of hydroxyl groups in this nucleus. Since the physiological activity of many cyclopentanoperhydrophenanthrene compounds is altered by the introduction of any double bonds or hydroxyl groups into the cyclopentanoperhydrophenanthrene nucleus, this feature of our discoveries is of substantial importance.

In the reaction we may use any organic sulfonic ester of an alcohol of the cyclopentanoperhydrophenanthrene series. We may mention, for example, cholesterol-p-toluene-sulfonate, ergosterol methane-sulfonate, testosterone methane sulfonate, dehydro androsterone benzene sulfonate and cholesterol methane-sulfonate.

We may react with the organic sulfonic esters any carboxylic acid ester which contains the group CHM, M being any metal which will exist in combination with CH. We may mention as examples of such carboxylic acid esters sodium ethyl acetate, sodium malonic ester, potassium ethyl malonic ester, potassium ethyl aceto acetate and magnesium malonic ester.

In carrying out the reaction according to our invention we may mix the organic sulfonic ester and the carboxylic acid ester in a container and allow the reaction to proceed. We prefer to add an organic solvent so that reaction takes place in the solvent, and also we prefer to heat the mixture moderately to speed the reaction. Heating to any temperature above room temperature is advantageous; however, the heating should not be carried to above 130° C. since above this point decomposition may be obtained. The reaction takes place rapidly at first and usually requires several hours for completion. The reaction mixture may be filtered and the solvent then removed from the filtrate by distillation. The resulting product in the distillation residue is an ester containing the cyclopentanoperhydrophenanthrene nucleus. The isolation of the ester may be done according to the methods given in the specific examples herein contained.

Better yields of the ester product may be obtained by using an excess of the carboxylic acid ester, and another factor contributing to better yields is the use of a hydrocarbon solvent as a medium for the reaction.

To illustrate the reaction we include the following chemical equation dealing with the reaction between cholesterol-p-toluene-sulfonate and sodium malonic ester:

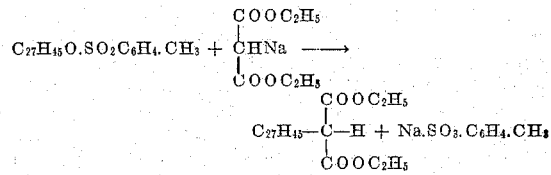

The products of this reaction are cholesteryl diethyl malonate and sodium-p-toluenesulfonate.

In the hydrolysis of the improved esters to prepare the acid derivative of the new esters we may dissolve the esters in an alcohol such as isopropyl alcohol and add an alkali such as potassium hydroxide. This mixture may be heated for several hours and the alkali salt of the acid is formed. This salt is decomposed by the addition of an acid such as dilute hydrochloric acid. The free acid may then be removed by filtration.

Where the reaction for the preparation of our new esters is conducted using as the organic sulfonic esters a 3-hydroxy cyclopentanoperhydrophenanthrene compound, the resulting ester products can be shown to contain isomers. This ester product may be hydrolyzed as above explained to prepare the corresponding acids. By extracting the acids so prepared with petroleum ether we may recover one fraction which is soluble in the petroleum ether and another fraction which is insoluble in the petroleum ether. These separate fractions represent different isomers. The ester isomers may also be obtained in separate products by esterifying the separate acid isomers. The preparation of the esters and acids in the forms of isomers is an important feature of our improvements.

When in the practice of our improvements as by the use of malonic acid ester we obtain dicarboxylic acids containing the cyclopentanoperhydrophenanthrene nucleus, we may transform these acids into mono carboxylic acids by heating to split off one of the carboxylic groups in the form of carbon dioxide.

The following specific examples will further serve to illustrate the practice of the invention:

Example I 23 g. of sodium were suspended in 400 cc. of xylene and heated in an oil bath. At about 90° C. a mixture of 200 g. of malonic ester and 200 cc. of xylene were slowly added. After all the sodium was dissolved a solution of 270 g. cholesterol-p-toluene-sulfonate in 540 cc. of warm xylene was poured into the sodium malonic ester solution. The reaction mixture was kept at 105 to 110° C. oil bath temperature for 12 hours, then cooled and the precipitate formed during the reaction filtered off. The xylene solution was steam distilled to remove the xylene and the residue taken up in ether. After drying over sodium sulfate the ether was distilled off and the residue recovered.

Example II

The residue product recovered in Example I was dissolved by heating in 500 cc. of isopropyl alcohol. 200 g. of potassium hydroxide dissolved in 500 cc. of methanol were added to the isopropyl alcohol solution and the mixture refluxed for 12 hours. After cooling the precipitate was filtered off, dissolved in water, acidified and extracted with ether. The methanol filtrate was diluted with water, acidified and extracted with ether, too. The ether extracts were combined and extracted with a 5% potassium hydroxide in water solution. The alkaline extract was freed from ether, acidified and filtered. The solid residue was dried and then dissolved in the minimum amount of hot ether to give a clear solution. Low boiling petrol ether was added to the ether solution until the solution remained turbid. After several hours at low temperature, a precipitate was formed and removed by filtration. The precipitate was washed with petrol ether on the filter and the mother liquor concentrated to reduce the ether content of it. More petrol ether was added, cooled and the precipitate filtered off. This procedure was repeated until no more petrol ether insoluble precipitate appeared. Then, the petrol ether was evaporated and the residue dried. By titration, both the petrol ether insoluble and the petrol ether soluble parts proved to be monocholesteryl malonic acids with a molecular weight close to 472. The petrol ether insoluble part could be obtained in a crystalline form by repeatedly dissolving it in ether and precipitating with petrol ether. It starts to decompose over 202° C.

The petrol ether soluble acid had a resinous appearance and could not be obtained in a crystalline form.

In case the acids are contaminated with unchanged cholesterol, they may be dissolved in methanol and precipitated with lead acetate in the form of their lead salts. The lead salts may then be washed with ether and decomposed with hydrogen sulfide to liberate the free acids.

Example III 40 g. of petrol ether insoluble cholesteryl malonic acid, prepared according to Example I, were dissolved in 400 cc. of methanol and 10 cc. of conc. sulfuric acid were added. The solution was refluxed for 8 hours, then cooled and diluted with water. The precipitate was extracted with ether, the ether washed with dilute alkali and with water. The ether layer was dried over sodium sulfate, the ether evaporated and the residue crystallized from absolute alcohol. The cholesteryl-dimethyl-malonate crystallized in clustered needles and had a melting point of from 87 to 88° C.

Example IV 40 g. of petrol ether soluble malonic acid were esterified in methanol according to Example III. A very viscous oil was formed, which even after using the chromatographic method could not be crystallized.

Example V 5 g. of petrol ether insoluble cholesteryl malonic acid, prepared according to Example I, were heated in a metal bath until strong foaming started. The bath was kept at this temperature until the foaming stopped. The reaction product was cooled, dissolved in ether and the ether solution extracted with 2% potassium hydroxide in water solution to which alcohol was added. The alkaline layer was acidified, the precipitate filtered off and crystallized from methanol. The cholesteryl acetic acid has a M. P. of 212 to 213° C.

Example VI

A solution of 2.3 g. of sodium and 20 g. of malonic ester was prepared in 60 cc. of xylene. 27 g. of ergosterolmethane sulfonate, suspended in 100 cc. of xylene, were added and the reaction mixture kept in a bath of 90 to 95° C. for 12 hours. Nitrogen was passed over the mixture during the heating period. Then the precipitate formed during the reaction was filtered off and the solution steam distilled to remove the xylene. The residue was dissolved in isopropyl alcohol, saponified with a concentrated potassium hydroxide solution and the saponification mixture worked up as described in Example I. Two isomeric and ergosteryl malonic acids were obtained, a petrol ether soluble and a petrol ether insoluble one.

Example VII 2.3 g. of sodium were suspended in 30 cc. of xylene. 20 g. of ethyl acetoacetate mixed with 20 cc. of xylene were slowly added. After all the sodium has been dissolved, 27 g. of cholesterol-p-toluenesulfonate dissolved in 50 cc. of xylene were added and the mixture kept for 10 hours in an oil bath at 100–110° C. bath temperature. The precipitate was filtered off, the solution steam distilled, the residue dissolved in isopropyl alcohol and saponified with a 20% potassium hydroxide solution in methanol. After 8 hours refluxing the solution was diluted with water, the insoluble removed by extraction with ether and the alkaline layer acidified. The precipitated cholesteryl acetic acid was filtered off, washed with water and dried.

The foregoing examples indicate certain specific ways in which our improvements may be practiced, but they are given for purposes of explanation only and it is understood that many other specific procedures may be used, all within the spirit of the invention.

This is a continuation of our co-pending application Serial No. 577,932, filed February 14, 1945, now abandoned, entitled "Cyclopentanoperhydrophenanthrene Compounds."

We claim:
1. An unsaturated cyclopentanoperhydrophenanthrene compound having attached at its 3-position a group of the structure

where Y is a radical chosen from the group consisting of H and COOH, said first-named group being attached to a fully saturated ring.

2. An unsaturated cyclopentanoperhydrophenanthrene compound having attached at its 3-position a group of the structure

3. 3-cholesterylmalonic acid.
4. 3-ergosterylmalonic acid.
5. A cholesteryl acetic acid of the formula

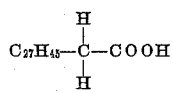

wherein the group $C_{27}H_{45}$ contains a fully saturated ring and the group

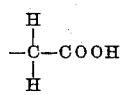

is attached to said ring.

6. A process for the manufacture of esters containing the cyclopentanoperhydrophenanthrene nucleus comprising reacting an organic sulfonic ester of an alcohol of the cyclopentanoperhydrophenanthrene series with a carboxylic acid ester containing the group CHM where M is a metal.

7. A process for the manufacture of esters containing the cyclopentanoperhydrophenanthrene nucleus comprising reacting an organic sulfonic ester of an alcohol of the cyclopentanoperhydrophenanthrene series with a sodium malonic acid ester.

8. A process for the manufacture of esters containing the cyclopentanoperhydrophenanthrene nucleus comprising reacting an organic sulfonic ester of an alcohol of the cyclopentanoperhydrophenanthrene series with a sodium aceto acetate.

9. A process for the manufacture of esters containing the cyclopentanoperhydrophenanthrene nucleus comprising reacting an organic sulfonic ester of cholesterol with a carboxylic acid ester containing the group CHM where M is a metal.

10. A process for the manufacture of esters containing the cyclopentanoperhydrophenanthrene nucleus comprising reacting an organic sulfonic ester of ergosterol with a carboxylic acid ester containing the group CHM where M is a metal.

11. A process for the preparation of acids containing the cyclopentanoperhydrophenanthrene nucleus comprising hydrolyzing a cyclopentanoperhydrophenanthrene carboxylic acid ester having the formula

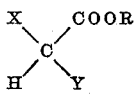

where X is a cyclopentanoperhydrophenanthrene radical, where Y is a radical chosen from the group consisting of H and $COOR_1$, $R_1$ being an organic radical, and where R is an organic radical, to prepare an acid therefrom.

EMIL KAISER.
JERRY SVARZ.

REFERENCES CITED

The following references are of record in the file of this patent:

UNITED STATES PATENTS

| Number | Name | Date |
|---|---|---|
| 2,247,822 | Schwenk | July 1, 1941 |
| 2,254,407 | Allardt | Sept. 2, 1941 |